UNITED STATES PATENT OFFICE.

OTTO HUGO SCHROEDER, OF LONDON, ENGLAND.

COMPOUND FOR PREVENTING THE FORMATION OF SCALE, CORROSION, AND PITTING IN STEAM-GENERATORS.

989,066. Specification of Letters Patent. Patented Apr. 11, 1911.

No Drawing. Application filed October 21, 1910. Serial No. 588,270.

*To all whom it may concern:*

Be it known that I, OTTO HUGO SCHROEDER, a subject of the King of Great Britain and Ireland, residing at 27 Frith street, Shaftsbury avenue, London, W. C., England, chemist, have invented a New or Improved Compound for Preventing the Formation of Scale, Corrosion, and Pitting in Steam-Generators, of which the following is a specification.

This invention relates to a new or improved compound, for the prevention of incrustation, corrosion, and pitting, in steam generators, and the like.

When the hydrate of barium $Ba(HO_2)$ is acted upon by an aqueous solution of tannin, preferably a solution of tannin capable of forming a glucoside, such as quercitannic acid $(C_{15}H_{12}O_9)$, barium tannate $(BaC_{15}H_{12}O_{10})$ is formed; this barium tannate is an excellent compound for preventing incrustation, corrosion, and pitting, in steam generators, and the like.

The incrustating properties in feed water are the salts of lime in solution, *i. e.*, the calcium carbonate $(CaCO_3)$ and the calcium sulfate $(CaSO_4)$. When barium tannate is introduced into water containing these calcium compounds the following reaction takes place:—

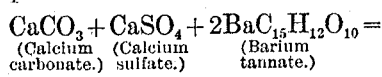
(Calcium (Calcium (Barium
carbonate.) sulfate.) tannate.)

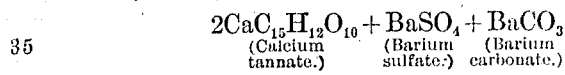
(Calcium (Barium (Barium
tannate.) sulfate.) carbonate.)

The calcium and barium compounds resulting from this reaction are not capable of forming scale, as they fall to the bottom in a non-adherent condition.

The barium tannate may be used either in the solid or in the liquid state, and may be mixed with the feed water before it enters the steam generator, or it may be fed into the generator, at suitable intervals, and in quantities dependent upon the amount of calcium compounds in solution in the water. After the reaction has taken place, the calcium and barium compounds obtained, may easily be removed by opening the blow-off cock of the boiler, for a few seconds.

In order to prevent corrosion and pitting, a solution of barium tannate, containing tannin in excess, may be employed. It has been found that water containing a small percentage of tannin will not corrode metal, and will also prevent pitting.

The barium tannate, instead of being manufactured from the barium hydrate $Ba(HO_2)$ may also be made from the barium carbonate, or any other compound or salt of barium which the tannin is capable of decomposing, and with the base (barium) it is able to combine, barium chlorid excepted.

In addition to the barium tannate, I may employ other substances such as sodium thiosulfate, sodium phosphate, or any other suitable organic or inorganic substances, hydrochloric acid excepted, without altering the substance of my invention, which is essentially the use of barium tannate for the prevention of the formation of scale, and corrosion, and pitting in steam generators.

I am aware that it has been proposed before to use a mixture of barium chlorid and tannic acid, which, however, does not form barium tannate as I propose to use. There is a strong objection to the use of this mixture of barium chlorid and tannic acid, inasmuch as calcium chlorid is formed with waters containing calcium salts. This calcium chlorid is liable to attack boiler mountings and packings, and corrode the boiler plates and rivets. The objection is done away with by the use of barium tannate as no chlorids can be formed.

What I claim as my invention and desire to secure by Letters Patent is:—

1. A compound for preventing the formation of scale, pitting and corrosion of steam generators consisting of a mixture of hydrate of barium and an aqueous solution of tannin.

2. A compound for preventing the formation of scale, pitting and corrosion of steam generators consisting of a mixture of hydrate of barium and an aqueous solution of tannin, capable of forming a glucoside.

3. A compound for preventing the formation of scale, pitting and corrosion of steam generators consisting of a mixture of hydrate of barium and an aqueous solution of tannin such as quercitannic acid.

4. A compound for preventing the formation of scale, pitting and corrosion of steam generators consisting of a mixture of hydrate of barium and an aqueous solution of tannin and the admixture of free tannic acid.

5. A compound for preventing the formation of scale pitting and corrosion of steam boilers consisting of barium tannate and free tannic acid.

In testimony whereof I have hereunto signed my name to this specification in the presence of two subscribing witnesses.

OTTO HUGO SCHROEDER.

Witnesses:
LIONEL ERNEST BUSSEY,
ROBERT OWEN HUGHES.